(12) United States Patent
Palatov

(10) Patent No.: US 11,563,241 B2
(45) Date of Patent: Jan. 24, 2023

(54) APPARATUS AND METHODS FOR REMOVABLE BATTERY MODULE WITH INTERNAL RELAY AND INTERNAL CONTROLLER

(71) Applicant: Dennis Palatov, Portland, OR (US)

(72) Inventor: Dennis Palatov, Portland, OR (US)

( * ) Notice: Subject to any disclaimer, the term of this patent is extended or adjusted under 35 U.S.C. 154(b) by 248 days.

(21) Appl. No.: 17/172,613

(22) Filed: Feb. 10, 2021

(65) Prior Publication Data
US 2022/0255139 A1    Aug. 11, 2022

(51) Int. Cl.
| | |
|---|---|
| *H01M 10/04* | (2006.01) |
| *H01M 10/42* | (2006.01) |
| *H04W 12/06* | (2021.01) |
| *B60R 16/023* | (2006.01) |
| *H01M 10/48* | (2006.01) |
| *H04L 9/40* | (2022.01) |
| *H04W 12/03* | (2021.01) |

(52) U.S. Cl.
CPC ....... *H01M 10/425* (2013.01); *B60R 16/0231* (2013.01); *H01M 10/482* (2013.01); *H04L 63/0876* (2013.01); *H04W 12/06* (2013.01); *H01M 2010/4271* (2013.01); *H01M 2010/4278* (2013.01); *H04L 63/0428* (2013.01); *H04W 12/03* (2021.01)

(58) Field of Classification Search
CPC ........... H01M 10/425; H01M 10/4271; H01M 10/482; H01M 10/48; H01M 10/441; H01M 10/44; H01M 2010/4271; H01M 2010/4278; B60R 16/0231; H04L 63/0876; H04L 63/0428; H04W 12/06; H04W 12/03
See application file for complete search history.

(56) References Cited

U.S. PATENT DOCUMENTS

| | | | |
|---|---|---|---|
| 8,051,285 | B2 | 11/2011 | Shankar et al. |
| 8,612,760 | B2 | 12/2013 | Shankar et al. |
| 9,509,096 | B2 * | 11/2016 | Zhao .................... H01R 13/648 |
| 2006/0156415 | A1 | 7/2006 | Rubinstein et al. |
| 2009/0146610 | A1 | 6/2009 | Trigianl |
| 2011/0270480 | A1 | 11/2011 | Ishibashi et al. |
| 2012/0032638 | A1 * | 2/2012 | Jung ..................... B60L 58/12 320/112 |
| 2015/0037656 | A1 * | 2/2015 | Noda ................ H01M 10/4264 429/149 |
| 2018/0046830 | A1 | 2/2018 | Shankar et al. |

* cited by examiner

*Primary Examiner* — Raymond Alejandro

(57) ABSTRACT

A battery module is disclosed having a plurality of battery cells and internal relay controllably coupled to an internal module controller, said controller having a plurality of programmed states. Transitions between programmed states are disclosed responsive to a secure command message, and responsive to a monitored operating condition. Passive and active states are disclosed. A modular battery pack is disclosed consisting of a plurality of modules connected in parallel, which can be individually and independently activated and deactivated responsive to a secure command message. Methods are provided for authentication of command messages and for authentication of the command message source.

12 Claims, 6 Drawing Sheets

APPARATUS AND METHODS FOR REMOVABLE BATTERY MODULE WITH INTERNAL RELAY AND INTERNAL CONTROLLER

This application is related to the co-pending application BATTERY MODULE WITH SERIES CONNECTED CELLS, INTERNAL RELAYS AND INTERNAL BATTERY MANAGEMENT SYSTEM Ser. No. 17/141,125, which is incorporated herein by reference in its entirety.

BACKGROUND OF THE INVENTION

A vehicle battery module typically has significant monetary value associated with it, often ranging in the hundreds or thousands of dollars.

Battery modules commonly known in the art are constructed to be permanently installed in a sealed battery pack that is not easily accessed or serviced. Due to this fact, there is no need seen to additionally secure, track, or deter theft of such modules. The difficulty of physically accessing and removing the modules known in the art is commonly considered sufficient deterrent to theft.

In the referenced co-pending application, the applicant discloses novel apparatus and methods for battery packs comprising a plurality of removable high voltage modules that are individually enabled and disabled.

Due to the ease of module removal and the ability to use same module in different packs which is inherent in the novel removable high voltage modules taught by the applicant, the need arises to track, control the use of, and deter theft of the modules.

Additionally, with battery packs configured to accept new or replacement removable modules, it is desirable to ensure that any newly installed modules are compatible with the specific pack and the apparatus powered by the pack, and are safe to enable for operation.

What is needed in the arts of vehicle batteries is a removable battery module design, and methods of operation of same, that facilitate control over the use of the modules, deter unauthorized or incompatible use, and facilitate both tracking of the modules in ordinary use and assist the recovery of any modules that are stolen.

SUMMARY OF THE INVENTION

A first objective of the present invention is to provide a removable high voltage battery module having a means to check whether an attempted use of the module is authorized, and to deter unauthorized use.

A second objective of the present invention is to provide a battery module design, battery pack design, infrastructure design and methods that facilitate tracking of the ordinary use of the module.

A third objective of the present invention is to provide a battery module design, battery pack design, infrastructure design and methods that assist the location and recovery of a module that has been stolen.

To achieve the objectives, a battery module of the present invention is assigned at least a unique identifier (ID) at the time of manufacture. In embodiments wherein modules have serviceable components, a first unique ID may be associated with non-serviceable components, and one or more serviceable components may be assigned additional unique IDs.

The module controller of the present invention contained within the module is provided with the means of secure communication with a pack controller.

A pack controller of the present invention is likewise assigned a unique ID at the time of manufacture, and is likewise provided with the means of secure communication with a module controller contained within one or more removable modules.

A pack controller is further provided with a means of securely communicating with an authentication controller.

Distinct programmed states of a removable battery module are disclosed, each of said states having a distinct set of module functions that are enabled, and may further have a distinct set of module functions that are disabled. In some states, certain module functions may be limited or restricted. In some states, unauthorized use of module is deterred.

Methods are provided for transitioning a module between distinct programmed states. Some of the transitions may be effected responsive to secure communications with an authentication controller.

Additional methods are provided for communicating module data from pack controller to data center, checking whether the specific module has been reported as stolen, reporting a module as stolen, and reporting a module as recovered.

BRIEF DESCRIPTION OF THE DRAWINGS

The present invention is described herein with reference to the following drawings. The components in the drawings are not necessarily to scale relative to each other. Like reference numerals designate corresponding parts throughout the several views.

DETAILED DESCRIPTION

Figure 1:
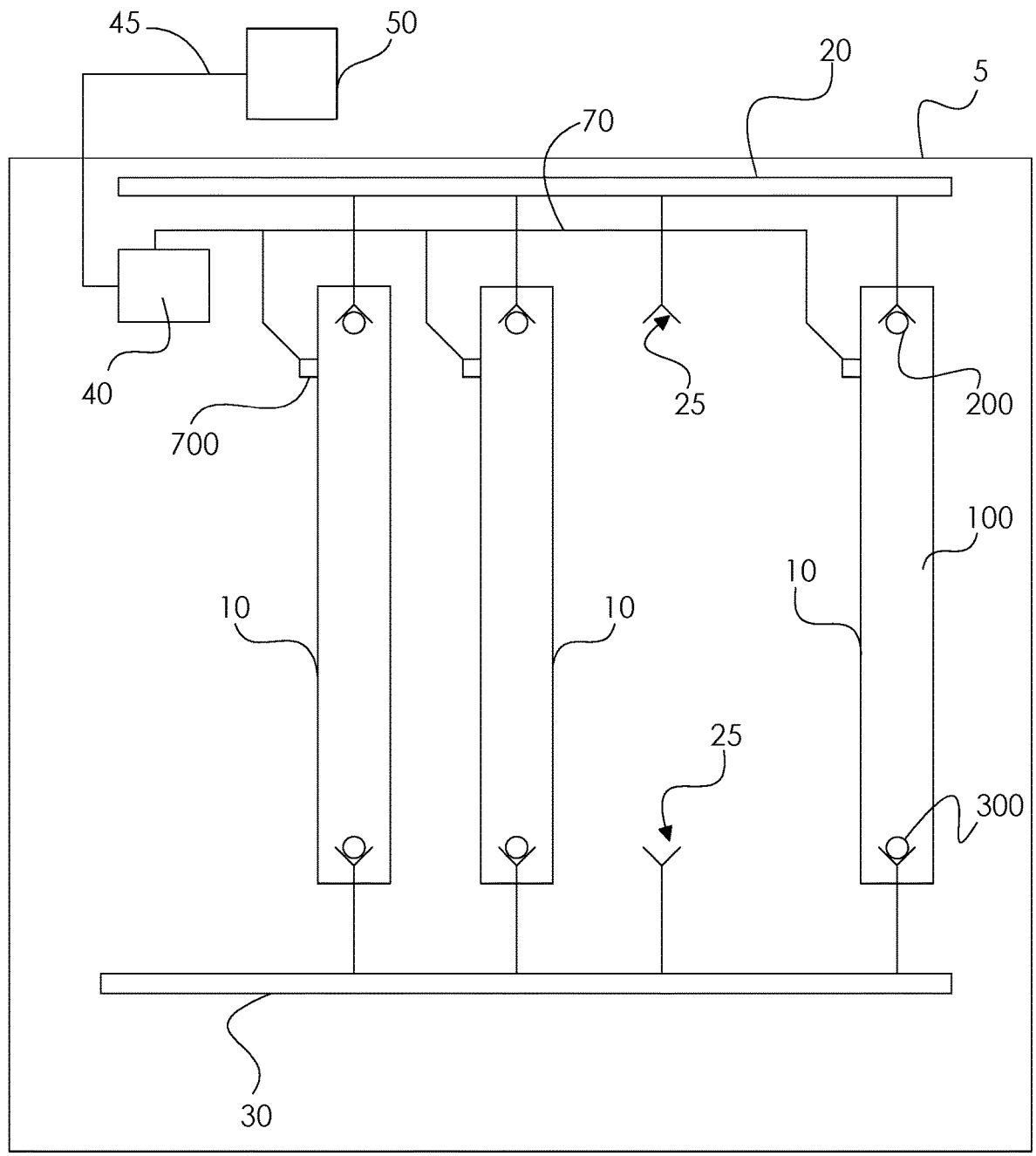
FIG. 1 is a diagram representation of a modular battery pack of the present invention communicatively coupled to an authentication controller.

An embodiment of a modular battery pack 5 of the present invention having a plurality of removable battery modules 10, and being communicatively coupled to authentication controller 50, is diagrammatically illustrated in FIG. 1. The illustrated embodiment is not limiting. Other embodiments shall become apparent to those skilled in the art based on the disclosures made herein.

The disclosed systems and methods for operating modular battery packs 5 having removable battery modules 10 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for the battery pack 5 and battery modules 10 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Electrically coupled", "electrically connected" means circuit elements connected in a way to enable conduction of electrical current between the elements.

"Connector", "electrical connector" means a structure or device to electrically couple circuit elements in a way that is releasable.

"Interconnect", "electrical interconnect" means a structure or device to electrically couple circuit elements in a way that is not releasable.

"Communicatively coupled" means that an electronic device is in communication with another electronic device for the purpose of transmission of electronic messages, either wirelessly or with a connector, whether directly or indirectly through a communication network.

"Controllably coupled" means that an electronic device controls operation of another electronic device.

"PCBA" means a printed circuit board assembly, comprising a non-conductive substrate, one or more etched electrically conductive traces for electrically coupling circuit elements, and one or more electrical circuit elements which may be integrated circuits, relays, cell interconnects and the like.

"Cell", "battery cell" refers to a single anode and cathode separated by electrolyte used to produce a voltage and current. A battery module of the present invention comprises one or more groups of cells connected in series within the group. Cells may be cylindrical, prismatic, pouch, or any other type. Cells may be of Lithium-Ion or any other chemical type.

"Command message", "command" is an electronic message sent from a first electronic circuit to a second electronic circuit to initiate an action or state change by said second circuit. In many embodiments, a command message will be a secure message transmitted by means of secure communication.

"Status message" is an electronic message sent by a second electronic circuit to a first electronic circuit, said message containing information pertaining to state or action status of said second circuit, or another circuit.

"Secure communication", "secure message" means communication by means of an encrypted message, or any other type of message that deters reading, modification or falsification by unauthorized parties or devices. Any type of known encryption may be utilized, including public key, private key, digital signing and the like. Different types of secure communication may be utilized within an embodiment for different types of messages. Encryption and decryption of messages may be carried out in software and may be carried out with hardware assist in controllers so equipped. Secure communication is well known in the arts of electronic devices and is therefore not described in detail herein.

"Unique ID" means a numeric or alphanumeric value that is generated to be unique and assigned to a specific physical device such as an electronic circuit, electronic assembly, or a machine which may be a vehicle. Generation and assignment of unique IDs is well known in the arts. Registration of unique IDs in a database is also well known. For vehicles, the unique ID typically takes the form of a Vehicle Identification Number (VIN). Various types of electronic circuits are known which have unique ID assigned and imbedded in them at the time of manufacture, such as controllers, processing units, networking controllers and the like. Assigning a unique ID to an electronic device is well known in the arts of electronic device design and is therefore not described in detail herein.

"Vehicle Identification Number", "VIN" means a unique ID that is officially assigned and registered to a vehicle by the vehicle manufacturer. A VIN is customarily recorded in a database by a Government agency.

"Product Identification Number", "PIN" means a unique ID that is assigned to apparatus comprising a battery pack by the manufacturer of the apparatus, when such apparatus is not a vehicle. Examples of apparatus having a PIN are battery chargers, in-home and commercial energy storage units, backup power supplies and the like. A PIN may be recorded in a database by the apparatus manufacturer, industry agency, or Government agency.

"Module Identification Number", "MIN" means a unique ID that is assigned to a battery module by the module manufacturer. A MIN may be recorded in a database by the module manufacturer, industry agency, or Government agency.

"Vehicle Control Unit", "VCU" means an electronic controller which is controllably coupled to and controls the operation of vehicle electronic and electromechanical systems responsive to operator inputs.

"Authentication controller" means an electronic device having a means to authenticate whether an attempted use of a battery pack or a battery module is authorized. For an electronic device that is a VCU, such means may include being communicatively coupled to a vehicle key. For a controller connected to the Internet or another network, such means may include being communicatively coupled to a data center having a database of registered PINs or MINs. Other authentication means may include sensing operator biometrics, entry of a passcode by the operator, or any other known authentication means.

"Battery module", "module" means an electronic device comprising a plurality of cells connected in series, a positive and a negative terminal, relays to electrically couple the plurality of cells to each of the positive and negative terminals, and means of controllably coupling the relays to a controller. In some embodiments the means of controllably coupling the relays to a controller is a Battery Management System (BMS) controller capable of secure communication.

"Battery pack", "pack" means electrical, mechanical and electronic apparatus configured to releasably receive a plurality of battery modules, electrically couple the received modules in parallel among like modules, electrically couple the modules collectively to an external electrical load or electrical source, and controllably couple the modules collectively to a controller. A battery pack may be configured to only charge the received modules, only discharge the received modules, or both.

"Battery module state", "module state", "state" means a distinct programmed configuration of a battery module in which some specific functionality of the module may be enabled, some specific functionality of the module may be disabled, and some specific functionality of the module may be limited or restricted. For example, charging and discharging current limits may be set to different specific values in different states, and may be set to zero in some states. In the context of the present invention and the descriptions presented herein, a module state is implemented by means of execution of a control program in the module controller to control one or more relays responsive to one or more controlling parameters which are stored in nonvolatile memory, and further responsive to monitored operating conditions such as current, voltage and temperature measurements. Monitoring of operating conditions is accomplished by means of measurement circuits and is well known in the arts of electronic circuit design. Storing parameters in nonvolatile memory is known in the art of controllers and is not described in detail herein. Transitions between states are accomplished programmatically responsive to command messages received by module controller, and may further be responsive to monitored operating conditions. Some state transitions may be conditional on successful authentication.

"Passive state" means a battery module state in which all relays are disabled, and which requires the reception of a valid command message from an authorized pack controller in order to transition to an active state. Transition from a first passive state to another passive state may be responsive to monitored operating conditions or responsive to a command and may require authentication.

"Active state" means a battery module state in which one or more relays are under active control of the module controller responsive to monitored operating conditions such as measured current, measured voltage, measured temperature, activated duration time period expiration, and the like. Transitions between active states, of from active states to passive states, may be responsive to monitored operating conditions or command and may require authentication.

"Charging current" means electrical current that flows into the module from an external electrical source such as a charger, adding to the electrical energy stored in the module.

"Discharging current" means electrical current that flows from the module to an external electrical load, subtracting from the electrical energy stored in the module.

FIG. 1 is a representative diagram showing battery pack 5 having a pack controller 40 which is communicatively coupled to an authentication controller 50 by means of a communications link 45. Each pack controller 40 is assigned a unique ID at the time of manufacture. For embodiments of battery packs 5 which are installed in a vehicle, the authentication controller 50 may be a Vehicle Control Unit (VCU) being communicatively coupled to a vehicle key and communications link 45 may be Controller Area Network (CAN) bus or similar. For embodiments of battery packs 5 which are installed in stationary structures, such as charging stations or in-home energy storage units, the authentication controller 50 may be a remotely located data center having a database, and communications link 45 may be the Internet communicatively coupling the pack controllers 40 to the authentication controller 50. In some embodiments, the authentication controller 50 may be a cellular phone, which may further be communicatively coupled to an Internet database, and communications link 45 may be wireless.

A plurality of removable modules 10 are illustrated. Also illustrated are vacant sockets 25 to receive an additional module that is not illustrated. The illustration is simplified for clarity and is not numerically or otherwise limiting.

Pack controller 40 is communicatively coupled to control bus connectors 700 of modules 10 via control bus 70. The pack controller 40 is the source of commands that are received by each of controllers 900 comprised within modules 10.

The positive terminals 200 and negative terminals 300 of modules 10 are electrically coupled to positive power bus 20 and negative power bus 30 by means of sockets 25. External electrical load such as an inverter, or an external electrical source such as a charger, is customarily electrically coupled to power bus 20 and power bus 30. Such coupling of a battery pack power bus to an electrical load or source is well known in the art and is omitted from the illustration for brevity. Some embodiments of battery pack 5 may further employ power distribution devices coupled to power busses such as fuses, relays, isolation monitoring circuits, current sensors and the like. Such devices being coupled to a power bus of a battery pack are well known in the art and are not illustrated. In some embodiments, the internal relays and circuits of the modules of the present invention comprised in a pack will render additional pack power distribution devices unnecessary, resulting in a reduction in pack cost and complexity.

Figure 2:
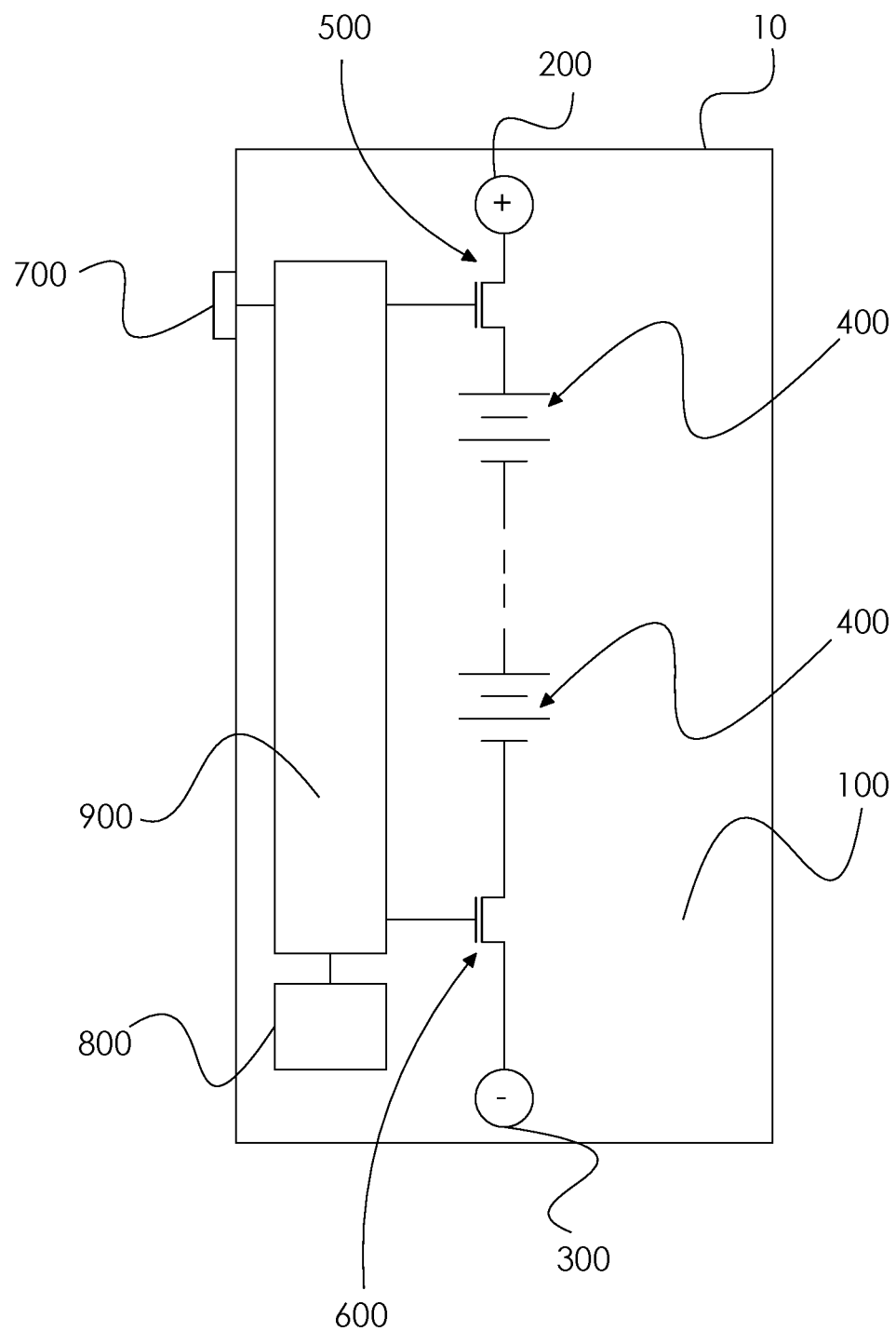
FIG. 2 diagrammatically illustrates a battery module of the present invention.

FIG. 2 is a conceptual illustration of the features of a battery module 10 of the present invention. The enclosure 100 is illustrated containing a plurality of cells 400, a positive terminal 200 being electrically coupled to said plurality of cells by relay 500, and negative terminal 300 being electrically coupled to said plurality of cells by relay 600. Relays 500 and 600 are controllably coupled to module controller 900, which is further communicatively coupled to control bus connector 700. Some embodiments of the present invention, which are not illustrated, may have only one relay to control the connection of the plurality of cells to only one of the terminals, while the other of the terminals is connected to the plurality of cells either directly or through a fusible link.

An optional operator interface 800 is diagrammatically illustrated being communicatively coupled to module controller 900. The operator interface may comprise visual indicators, pushbuttons, switches, audible indicators and the like, for the purpose of indicating module state and obtaining operator input. Operator interfaces are well known in the art and are not detailed herein. Some embodiments may omit an operator interface.

In some embodiments the operator interface 800 may not be physically comprised within the module, and may be a cellular phone configured with an operator interface app, said cellular phone being communicatively coupled to module controller 900 by a wireless link such as Bluetooth.

Figure 4:
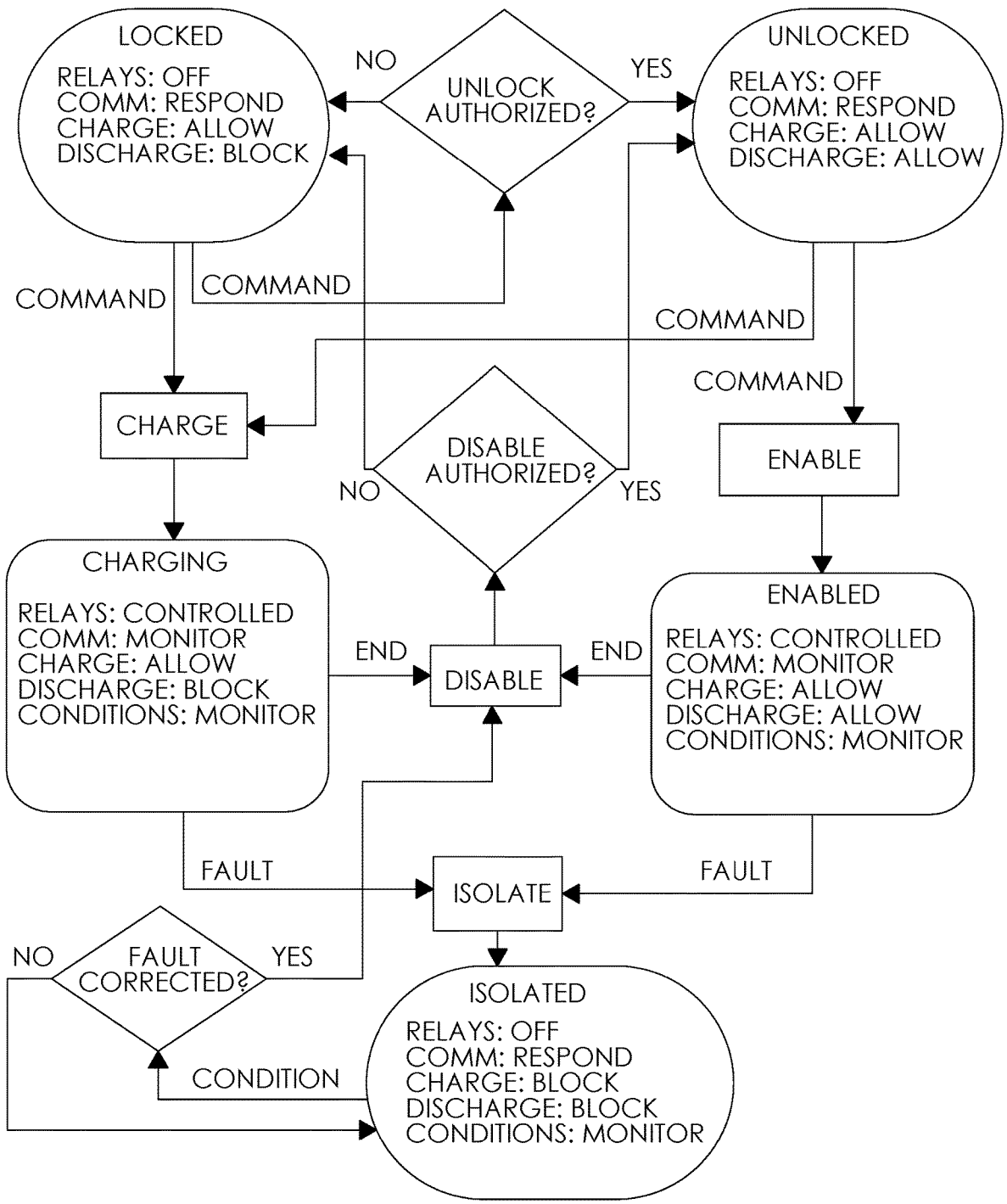
FIG. 4 is a state diagram showing the programmed states of a module of the present invention and the transitions between said states.

In embodiments having an operator interface, a module controller in a FAULT or LOCKED state (as illustrated in FIG. 4 and further described below) may periodically report its state by means of said interface. For example, a visual indication may be shown at predetermined intervals, such as an illuminated Light Emitting Diode (LED). In embodiments having a wireless link to the operator interface, the periodic indication may be by means of a wireless transmission.

Figure 3:
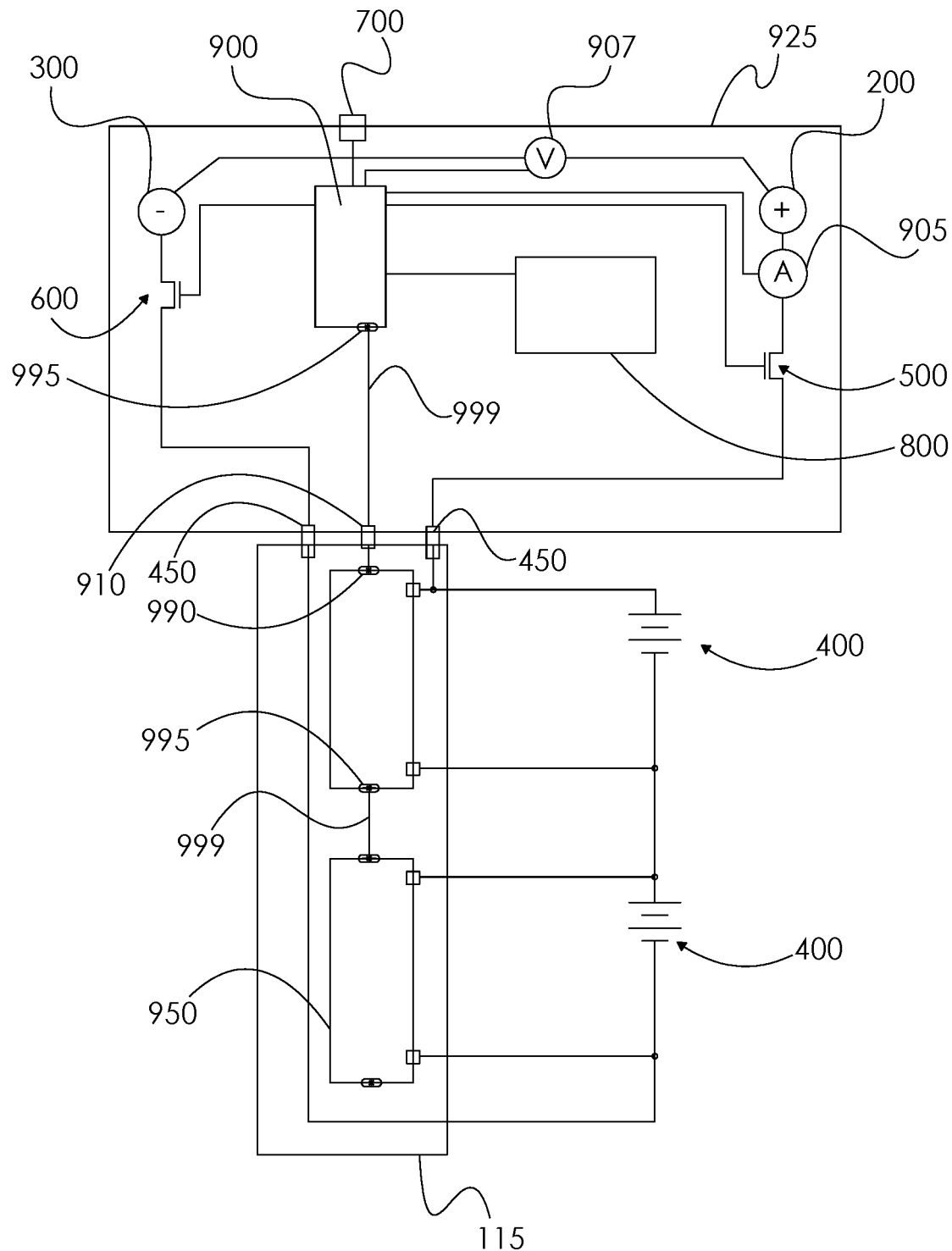
FIG. 3 shows an external interface PCBA comprising a module controller and associated circuitry, a cell monitoring PCBA having a plurality of cell monitoring and conditioning circuits, said circuits being coupled to a plurality of cells.

One embodiment of the electronic apparatus of a module 10 is illustrated in further detail in FIG. 3, comprising an external PCBA 925 and a module conditioning and monitoring PCBA 115. In other embodiments, the illustrated circuitry may be combined on a single PCBA. In still other embodiments, the circuitry may be distributed over a plurality of distinct assemblies, some of which may be flexible.

The external interface PCBA 925 is shown comprising positive terminal 200, negative terminal 300, battery module controller 900, control bus connector 700, connectors 450 for electrically coupling to cells 400, and communication connector 910 for communicatively coupling to PCBA 115 and the cell monitoring and conditioning circuits 950 comprised therein.

An optional operator interface 800 is illustrated being communicatively coupled to the module controller 900, however some embodiments may omit an operator interface.

A current sensor 905 is illustrated as being coupled to the positive terminal 200, other embodiments may couple a current sensor to negative terminal 300. A voltage measurement circuit 907 is shown connected to terminals 200 and 300. In some embodiments, voltage measurement circuit 907 may be internal to module controller 900. Relays 500 and 600 are also shown. Other embodiments may have additional relays to connect multiple groups of series-connected cells in series or in parallel with each other. Such configurations are disclosed in the referenced application not illustrated herein for brevity. Some additional embodiments may omit one of the relays 500 and 600 without departing from the scope of the present invention and are likewise not illustrated herein.

In some embodiments, relay 500 may be of a first type, and relay 600 may be of a second type. For example if the first type of relay is electromechanical it provides complete galvanic isolation when open. However, electromechanical relays are relatively slow to respond. If the second type of relay is solid state, which responds to control input very quickly, it can be used to rapidly open the circuit if current sensor 905 detects excessive current. Some solid state relays may not provide complete galvanic isolation. By utilizing two distinct types of relays, a PCBA 925 can provide both full galvanic isolation and fast response to variations in measured current.

In some embodiments, the current sensor 905 may be of Hall Effect type, and may sense both magnitude and direction of current.

Circuits 950 are communicatively coupled to each other and to module controller 900 by means of uplink ports 990 and downlink ports 995, connected by communication links 999. Details of the circuits 950 are disclosed in the referenced application and are not illustrated here. Pertinent to the methods disclosed herein, circuits 950 measure the individual voltages of cells 400 and communicate the results of the measurements to module controller 900 by means and methods disclosed in the referenced application.

A control bus port 700 is provided for communication with an external controller such as pack controller, Vehicle Controller Unit (VCU), charger and the like.

In some embodiments, terminals 200 and 300, and control bus port 700, may be combined into a single physical connector.

Additional low voltage power connector may be provided in some embodiments to power the module controller 900 and relays 500 and 600 independently of the cells 400, and may further be combined into a single physical connector with the terminals and the control bus port.

FIG. 4 is a representative state diagram showing programmed states of an embodiment of a battery module of the present invention, the representative functionality associated with each state, and the transitions between the states. FIG. 4 is illustrative and not limiting.

A battery module is configured to have distinct programmed states by means of storing an executable program in non-volatile memory associated with module controller 900, and then executing said program. Such programs, means of storing them in non-volatile memory, and means of securely updating them via a communications link are well known in the art of controllers and are not detailed herein. Non-volatile memory for storing an executable program is customarily provided in controllers known in the art.

The illustrated states are of two types: passive states, which include LOCKED, UNLOCKED and ISOLATED, and active states which include CHARGING and ENABLED. The names of the states used herein are descriptive for the purpose of distinguishing between the illustrated states and are not limiting.

In active states, one or more relays are actively controlled by module controller 900 responsive to monitored operating conditions and further responsive to any programmed parameters associated with the specific state. Control bus port 700 is monitored for reception of valid command messages by the module controller 900. Time since reception of the most recent valid command message is compared to a predetermined timeout period. This functionality is indicated in the diagram of FIG. 4 by the COMM: MONITOR legend. Monitored operating conditions may include magnitude and direction of current measured by current sensor 905, terminal voltage measured by voltage sensor 907, individual cell temperature and voltage reported by each of circuits 950, and the like.

In passive states, all relays are turned off and the plurality of internal cells 400 are electrically isolated from the terminals 200 and 300. The module controller 900 may be active, in a low power condition or powered down.

Transition from one state to another state may be initiated by the module controller 900 responsive to a valid command from an authorized pack controller 40 (FIG. 1). An authorized pack controller 40 has a unique ID which is on a list of authorized pack controllers maintained by the module controller 900. In embodiments wherein multiple lists of authorized controllers are maintained, each list may correspond to a specific set of state transitions the listed pack controllers 40 are authorized to command, which may be distinct from the set of state transitions that controllers listed on another list are authorized to command.

In some embodiments a list of authorized pack controllers may contain additional data associated with each authorized pack controller 40, which may be used to further authorize or restrict state transitions that may be commanded by the pack controller 40. A list may be maintained in non-volatile memory comprised in the module controller 900, or another circuit comprised within the module 10.

In some embodiments, a pack controller 40 may further maintain a list of module controller IDs that have been connected to the pack. Such a list may further contain data on module usage, and whether a module has been removed without authorization.

Both pack controller lists maintained by module controller and module controller lists maintained by pack controller, along with any associated data, may be periodically uploaded to a database, which may be communicatively coupled to an authentication controller 50 (FIG. 1).

The module controller 900 (FIG. 2) may transition from a passive state to another passive state responsive to a monitored condition. From a passive state, the module controller 900 may only transition to an active state responsive to a valid command from an authorized pack controller 40.

A module controller 900 may transition from an active state to another active state responsive to a monitored condition or a valid command from an authorized pack controller 40.

A module controller 900 may transition from an active state to a passive state responsive to an end condition, a fault condition, or a command.

In some embodiments the illustrated end condition may be defined as receiving a valid disable command, reaching a predetermined module voltage threshold, reaching a predetermined module current threshold, reaching a predetermined module temperature threshold, or any other programmed combination of monitored operating conditions. In the illustrated embodiment, an end condition is indicative of ordinary use, does not require corrective action and does not preclude further ordinary use of the module.

Upon reaching an end condition, the module is disabled by transitioning to a passive state. Authentication steps may be attempted during the transition to determine whether the module should be placed in a specific passive state which may allow or restrict certain subsequent state transitions without further authentication.

In some embodiments the illustrated fault condition may be defined as crossing a predetermined module voltage threshold, exceeding a predetermined module current threshold, detecting unauthorized discharge current, exceeding a predetermined module temperature threshold, exceeding a timeout period without receiving a new valid command, or any other programmed combination of monitored operating conditions. In the illustrated embodiment a fault condition is indicative of faulty, unauthorized or dangerous use that may require corrective action and precludes further ordinary use of the module 10 (FIG. 1) until the condition is corrected.

For example, unauthorized physical removal of a module from a pack without authenticating such removal would result in the module transitioning to a LOCKED state. This, in the illustrated embodiment, would allow the module to be charged but would require further successful authentication before the module can transition to an ENABLED state.

FIG. 4 further shows a list of representative module functionality that is associated with each illustrated module state.

The illustrated embodiment allows charging of a module that is in a LOCKED state in order that a module may be maintained in a safe state of charge even in the absence of authentication. In other embodiments, the transition to CHARGING state may require authentication to further deter unauthorized use or to ensure compatibility of the module with the charging apparatus. This may be particularly desirable for modules that are capable of being configured to operate at more than one voltage, as disclosed in the referenced application.

Some embodiments may have a plurality of active states, each having distinct programmed parameters. For example, embodiments may have a plurality of CHARGING states having distinct charging current limits associated with each state, which may be responsive to measured conditions such as voltage and temperature, and may further be responsive to authentication.

Some embodiments may have a plurality of ENABLED states having distinct charging current limits and discharging current limits associated with each state, which may be responsive to measured conditions such as voltage and temperature, and may further be responsive to authentication.

Embodiments may have a plurality of passive states, including states having an associated list of known pack controllers 40 (FIG. 1) that are authorized to command a transition to another state. Such authorized pack controller lists may be stored in nonvolatile memory comprised in the module controller 900 or another electronic circuit comprised in PCBA 925 or PCBA 115, and may further be encrypted.

A list of authorized controllers 40 may be received by a secure message, compiled through previous authenticated installations as disclosed herein, or by another method such as programming during manufacture of the module.

In some embodiments of programmed states, only pack controllers 40 that are identified on a specific authorized list, or have specific authorization attributes recorded in the list, may command transitions to another state. In such states commands from pack controllers not identified on the list are disregarded.

In some embodiments of programmed states, pack controllers that are not on an authorized pack controller list may be enabled to issue state transition commands to specific other states without requiring authentication. The illustrated LOCKED state is an example of such a restricted state wherein the transition to the CHARGING state may be commanded by unauthorized or restricted pack controllers, but the transition to the UNLOCKED state may only be commanded by an authorized pack controller. This is useful when communications links necessary for authentication are not available.

In passive states, the receipt of a command message by the module controller 900 via control bus port 700 triggers the processing of the message by the controller and a corresponding response. This functionality is indicated in the diagram of FIG. 4 by the COMM: RESPOND legend. In some embodiments wake-on-comm functionality may be used to bring the module controller 900 out of a powered down or low power condition upon receipt of a command message. Wake-on-comm functionality is well known in the art of controllers and is not described in detail herein.

In other embodiments low voltage electrical power may be supplied to the module controller 900 via control bus port 700 prior to the receipt of a command message by the controller.

Figure 5:
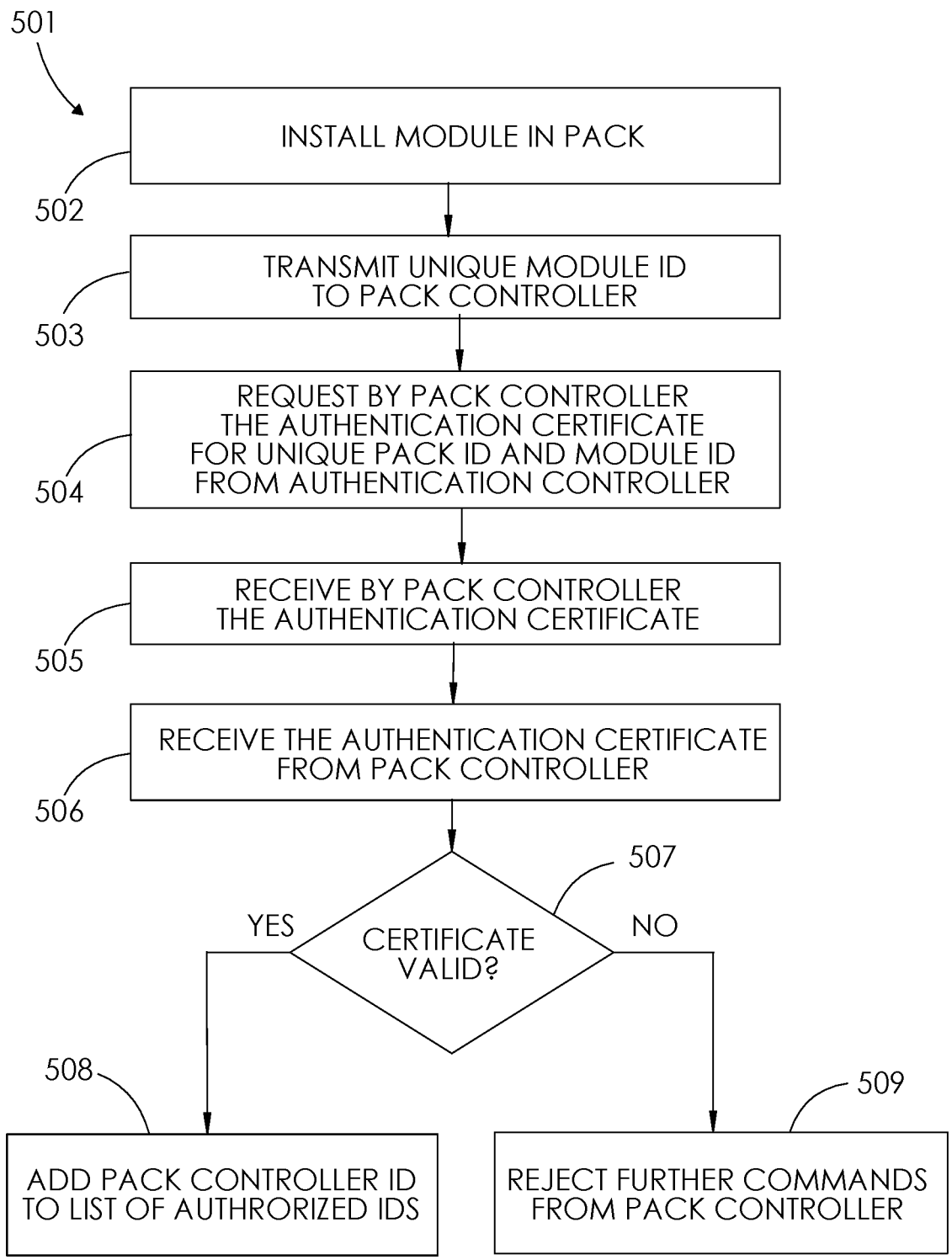
FIG. 5 illustrates the authentication method of the present invention.

A flow chart 501 for a method of authenticating a command source is illustrated in FIG. 5. It should be noted that in some alternative implementations, the functions noted in the blocks may occur out of the order noted in FIG. 5, may include additional functions, and/or may omit some functions. For example, two blocks shown in succession in FIG. 5 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

Upon installation of a module into a pack at block 502, the unique module ID (MIN) is then transmitted to the pack controller at block 503. At block 504, the pack controller 40 requests an authentication certificate from the unique pack ID and module ID from the authentication controller 50. Then, at block 505, the pack controller 40 may then obtain an authentication certificate from the authentication controller, which in some embodiments may be a secure message configured to be readable by the module controller having the specific MIN. As a step in the process of obtaining the authentication certificate, the pack controller may transmit its unique pack ID to the authentication controller, to be included in the authentication certificate. Methods of obtaining such secure messages are well known in the art of secure communications. The authentication certificate may further contain information such as the vehicle ID (VIN) or product ID (PIN) associated with the battery pack in which the module has been installed.

Once obtained, the authentication certificate is communicated by pack controller 40 to the specific module 10 to authenticate the identity of the pack controller 40 to the module controller 900 comprised within the module at block 506, said controller 900 having the unique MIN for which authentication certificate was obtained. At block 507, a determination is made whether the certificate is valid. Once authenticated (the YES condition), the unique ID of the pack controller 40 at block 508 may be added by the module controller 900 to a list of authorized command source IDs, in order that further authentication not be required for commands received from the pack controller having said unique ID. If not authenticated (the NO condition), further commands from the pack controller 40 are rejected at block 509.

A pack controller 40 having a unique ID which has been successfully authenticated and added to a list of authorized command source IDs is referred to as an authorized controller in the descriptions provided herein. A pack controller having a unique ID that has not been successfully authenticated may be added by means of steps further disclosed below, and is referred to as a restricted controller in the descriptions provided herein.

Figure 6:
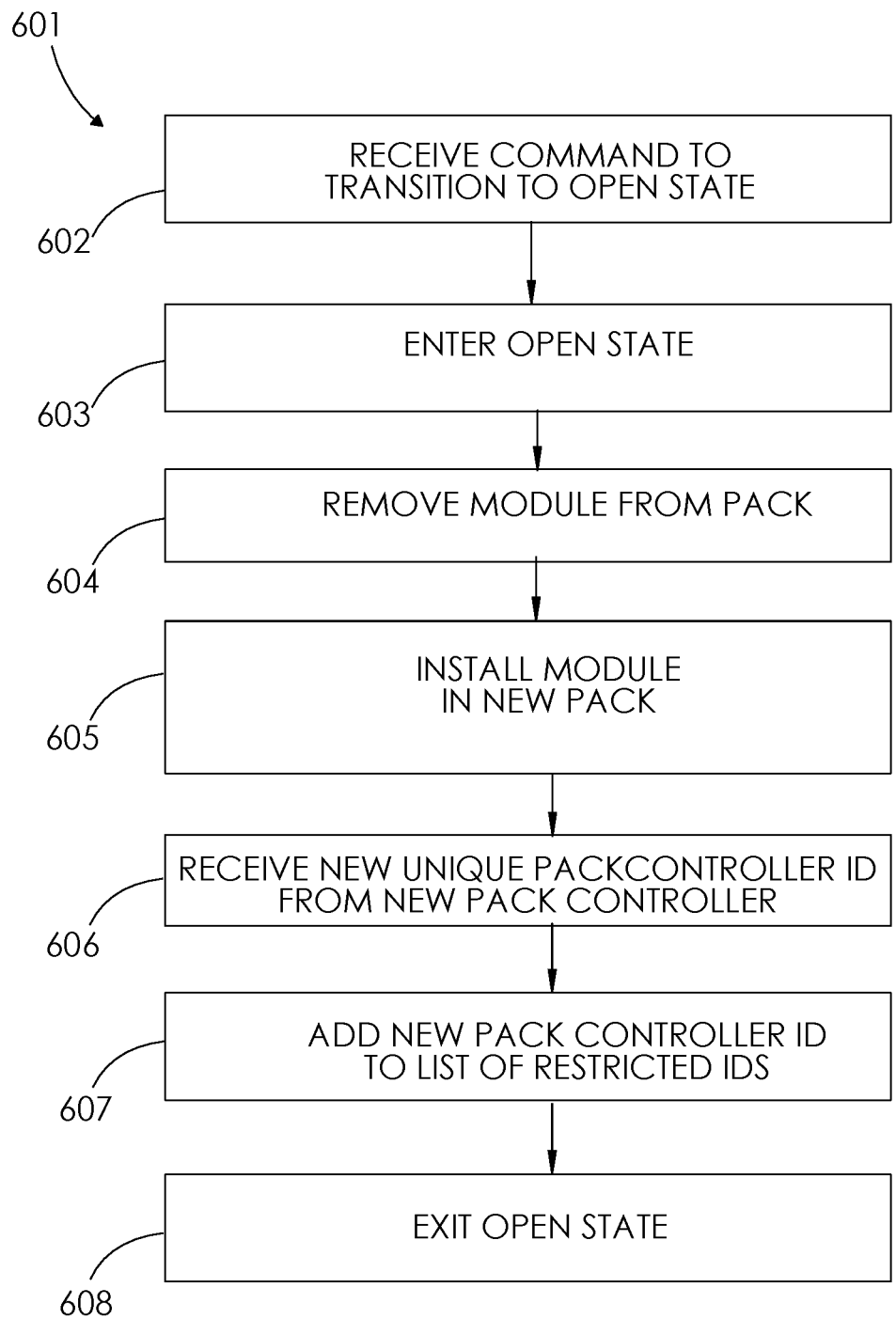
FIG. 6 is a diagram of additional steps of the authentication method.

Further steps of the authentication method are illustrated in the flow chart 601 in FIG. 6. It should be noted that in some alternative implementations, the functions noted in the blocks may occur out of the order noted in FIG. 6, may include additional functions, and/or may omit some functions. For example, two blocks shown in succession in FIG. 6 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The functions illustrated in the blocks of FIG. 6. facilitate the addition of new pack controllers 40 (FIG. 1), which do not have an available communications link to an authentication controller 50, to a list of restricted pack controllers from which some commands may be accepted without requiring authentication. In some embodiments such a list may be distinct from the list described in block 508 (FIG. 5). In other embodiments the list may be the same list described in block 508, but with additional information pertaining to command restrictions associated with the newly added pack controller ID.

An authorized pack controller 40 may issue a command at block 602 to the module controller 900 to transition the module to a specific static state, herein descriptively referred to as OPEN, in which the next pack controller 40 placed in communication with the module will be added to the list of restricted command source IDs without the requirement to authenticate the identity of the new pack controller, albeit with restrictions on specific commands that the new restricted controller may issue.

After a module transitions to the OPEN state at block 603, it is removed from the authorized pack at block 604 and installed in a new pack at block 605. The unique pack ID is then obtained from the new pack controller 40 at block 606 and added to a list of restricted pack controller IDs at block 607. Upon completion of the above steps, the OPEN state is exited at block 608.

An example of the restrictions that may be associated with a restricted controller is disregarding commands from the newly added pack controller to transition to OPEN state. Such a restriction would ensure that only authorized pack controllers can command a module to transition to the OPEN state. This example is illustrative and not limiting. Other restrictions may be implemented in some embodiments, as appropriate to the embodiment. Some embodiments may further implement different levels of restrictions for different restricted controllers.

In some embodiments, operator input via an operator interface may be further required as part of the authentication process. This input may include selecting options from an on-screen menu, entering a passcode, sensing operator biometrics, and the like. Many such authentication methods and operator interfaces are known, including handheld devices with wireless communications, and are not described in detail herein. The embodiments disclosed herein are illustrative and not limiting; other embodiments shall be readily apparent to those skilled in the art based upon the disclosures made herein, without departing from the scope of the present invention.

It should be emphasized that the above-described embodiments of the battery module 10 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

The invention claimed is:

1. A battery module comprising:
    an enclosure;
    a plurality of battery cells contained within said enclosure, said plurality of battery cells being electrically isolated from said enclosure;
    a positive terminal;
    a negative terminal;
    a control bus port;
    a module controller being communicatively coupled to said control bus port; and
    a relay being electrically coupled to said plurality of battery cells, and being further electrically coupled to one of said positive terminal and said negative terminal, said relay being controllably coupled to said module controller,
    wherein the plurality of battery cells are connected to said one of the positive terminal and the negative terminal of the battery module in response to said relay being controlled by said module controller, and
    wherein said module controller is configured to have a plurality of programmed states, and
    wherein said module controller is further configured to transition between said plurality of programmed states in response to a command from a pack controller that is received by said control bus port.

2. The module of claim 1 further comprising:
    a measuring circuit configured to monitor an operating condition of the module, said measuring circuit being communicatively coupled to said controller,
    wherein said module controller is configured to transition between said plurality of programmed states responsive to at least the operating condition monitored by said at least a measuring circuit.

3. The battery module of claim 1 wherein said plurality of programmed states comprises a passive state and an active state,
    wherein said passive state corresponds to said relay being controlled to disconnect said plurality of cells from said one of the positive terminal and the negative terminal, and
    wherein said active state corresponds to said relay being controlled to electrically connect said plurality of cells to said one of the positive terminal and the negative terminal, respectively.

4. The battery module of claim 1 wherein said command received by said control bus port is a secure message.

5. The battery module of claim 1 wherein said module controller is further configured to authenticate the identity of a source of said command received by said control bus port.

6. The battery module of claim 5 wherein said source of said command has a unique identifier (ID), and wherein said module controller is further configured to authenticate an identity of the source of said command by checking whether said unique ID is on a list of authorized command source IDs.

7. The battery module of claim 5 wherein said source of said command has a unique identifier (ID), wherein said command source is communicatively coupled to an authentication controller, and wherein said module controller is further configured to authenticate an identity of the source of said command by receiving a secure message from said authentication controller by means of said command source.

8. The battery module of claim 1 wherein said module controller is further communicatively coupled to an operator interface, and said module controller is further configured to authenticate an identity of a source of said command received by said control bus port, said authentication being received from the operator interface.

9. The module of claim 1, wherein said relay is a first relay, wherein said first relay electrically is coupled to said positive terminal, wherein said first relay is controllably coupled to said module controller, and further comprising:
    a second relay being electrically coupled to said plurality of battery cells, and being further electrically coupled to said negative terminal, said second relay being controllably coupled to said module controller.

10. A modular battery pack comprising:
    a plurality of modules;
    a positive bus bar;
    a negative bus bar;
    a pack controller;
    a communications link for communicatively coupling said pack controller to an external authentication controller; and
    a control bus for communicatively coupling said plurality of modules to said pack controller,
    wherein each said module further comprises:
        an enclosure,
        a plurality of battery cells contained within said enclosure, said plurality of battery cells being electrically isolated from said enclosure,
        a positive terminal;
        a negative terminal;
        a control bus port;
        a module controller being communicatively coupled to said control bus port; and
        a relay being electrically coupled to said plurality of battery cells, and being further electrically coupled to one of said positive terminal and said negative terminal, said relay being controllably coupled to said module controller,
    wherein the positive terminal of each of the said plurality of modules is connected to said positive bus bar,
    wherein the negative terminal of each of the said plurality of modules is connected to said negative bus bar,
    wherein the control bus port of each of the said plurality of modules is connected to said control bus, and
    wherein the plurality of battery cells comprised in each said module are connected between the positive terminal and the negative terminal of the module in response to said at least one of the first relay and the second relay of the module receiving the control input from said module controller or the module.

11. A method of activating a battery module in a battery pack, said battery pack having a pack controller being communicatively coupled to an external authentication controller, said pack controller having a unique identifier (ID), said battery module comprising a plurality of battery cells, a positive terminal, a negative terminal, a module controller being communicatively coupled to said pack controller, said module controller having a unique ID, a relay and being controllably coupled to the module controller, said relay being electrically coupled to the plurality of battery cells, said relay being electrically coupled to one of the positive terminal and the negative terminal of the battery module, wherein said relay controls electrical connection of said plurality of cells to said one of the terminals, said module controller being configured to have a plurality of programmed states, said module controller further being configured to control said relay responsive to said plurality of programmed states, said plurality of programmed states comprising at least a passive state and at least an active state, said module controller further having at least a first list of authorized pack controller unique IDs, said method comprising:

installing the module in the battery pack, said module having the module controller in a first programmed state which is a passive state, said first programmed state having the parameter of requiring authentication of command source;

transmitting by the module controller the unique ID of the module controller to the pack controller;

transmitting an authentication certificate request from the pack controller to the external authentication controller, said authentication request comprising at least the unique ID of the module controller, and the unique ID of the pack controller;

receiving by the pack controller the authentication certificate from the authentication controller;

receiving by the module controller the authentication certificate from the pack controller; and if the received authentication certificate is valid, adding the pack controller unique ID to the first list of authorized pack controller unique IDs by the module controller and enabling transitioning of the module controller to another programmed state responsive to command from a pack controller having unique ID that is on at least a list of authorized pack controller unique IDs.

12. The method of claim 11, said method further comprising:

receiving by the module controller from the pack controller a command to transition to a second programmed state, the unique ID of said pack controller being on the first list of authorized pack controller unique ID of the module controller, said programmed state being static, said programmed state further having the parameter of not requiring authentication of command source;

removing the battery module from the battery pack;

installing the battery module in a second battery pack;

receiving by the module controller the unique ID of the pack controller of the second battery pack;

adding the pack controller unique ID of the pack controller of the second pack to a list of restricted pack controller unique IDs by the module controller;

transitioning the module controller to the first programmed state, said first programmed state having the parameter of requiring authentication of command source, and enabling transitioning of the module controller to another programmed state responsive to command from a pack controller having unique ID that is on at least a list of restricted pack controller unique IDs.

\* \* \* \* \*